United States Patent [19]

Hall

[11] Patent Number: 4,775,101

[45] Date of Patent: Oct. 4, 1988

[54] SAFETY VALVE

[76] Inventor: Marshall G. Hall, 4 Caldwell Ave., East Lismore, New South Wales 2480, Australia

[21] Appl. No.: 24,055

[22] Filed: Mar. 10, 1987

[30] Foreign Application Priority Data

Mar. 11, 1986 [AU] Australia ............................. PH4966

[51] Int. Cl.⁴ ............................................. G05D 23/10
[52] U.S. Cl. .................................. 236/48 R; 137/457; 236/93 B; 236/101 D
[58] Field of Search ................. 236/93 B, 48 R, 93 R, 236/101 D; 251/74; 137/457

[56] References Cited

U.S. PATENT DOCUMENTS

| | | | |
|---|---|---|---|
| 1,836,606 | 12/1931 | Lapp et al. | 236/48 R |
| 1,982,582 | 11/1934 | Lovekin | 137/457 X |
| 2,131,094 | 9/1938 | Clark | 137/457 X |
| 2,387,792 | 10/1945 | Holmes | 236/48 R |
| 2,521,469 | 9/1950 | Marks, Jr. | 251/74 X |
| 3,349,786 | 10/1967 | Martin | 251/74 X |
| 3,911,940 | 10/1975 | Johnson | 251/74 X |
| 4,026,465 | 5/1977 | Kenny | 236/48 R |
| 4,361,167 | 11/1982 | Harasewych | 236/48 R X |
| 4,637,425 | 1/1987 | Petersen | 251/74 X |

FOREIGN PATENT DOCUMENTS

| | | |
|---|---|---|
| 387096 | 2/1933 | United Kingdom . |
| 506025 | 5/1939 | United Kingdom . |
| 835041 | 5/1960 | United Kingdom . |
| 1428249 | 3/1976 | United Kingdom . |
| 1534026 | 11/1978 | United Kingdom . |
| 1594982 | 8/1981 | United Kingdom . |
| 2153046 | 8/1985 | United Kingdom . |

Primary Examiner—William E. Tapolcai
Attorney, Agent, or Firm—Ladas & Parry

[57] ABSTRACT

A safety valve for a fluid delivery system having a duct in which the safety valve is housed. The safety valve comprises a temperature sensitive means through which fluid passes, this temperature sensitive means being connected to a retaining means which retains a valve member in the cocked position. The associated valve seat is located downstream of the valve member and allows passage of fluid therethrough when the valve member is cocked. When a predetermined temperature is reached by the fluid the retaining means disengages the valve member which is biassed towards the valve seat and subsequently seals the passage through the valve seat.

10 Claims, 4 Drawing Sheets

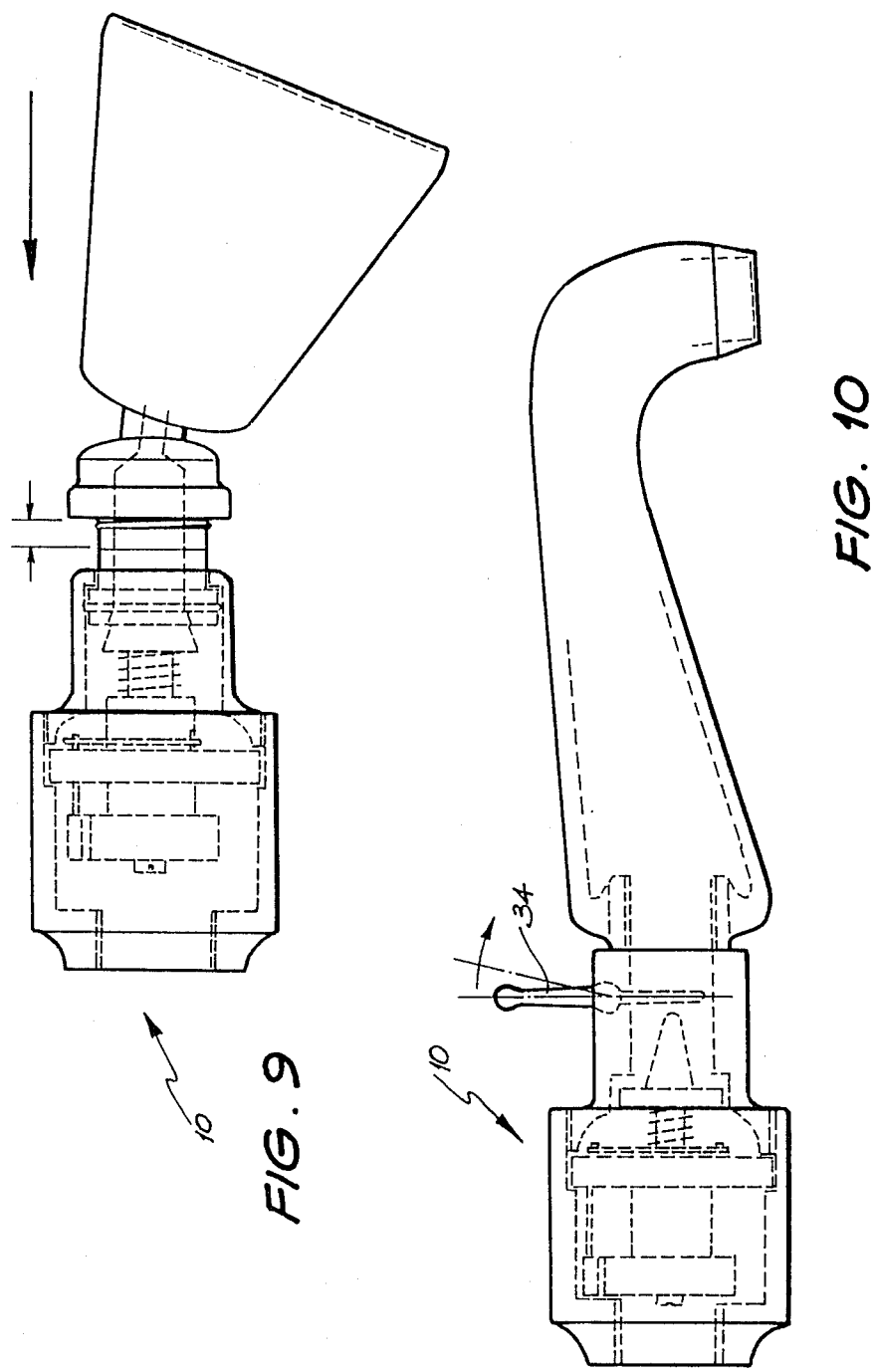

SAFETY VALVE

The present invention relates to safety valves and in particular to automatic shut off valves which react to temperatures.

In the past there have been many accidents due to the misuse of hot water. Children, invalids and aged persons in particular are susceptible to severe burns when scalded by too hot water whilst in the bath or shower. It is all too easy to leave a hot tap running in the home (or in industry for that matter) and as a result even a responsible adult could receive a bad burn. A tap left running in a bath or basin could also lead to overflowing.

Off peak and solar water heating systems in particular, retain water at very high temperatures, to enable use throughout the day, and therefore temperatures in excess of those that a person can tolerate may be involved.

Since a burn at high temperatures occurs quickly it is necessary that there is a valve which shuts off immediately a predetermined temperature is exceeded. Therefore a safety valve which is activated by extremes in temperature, either hot or cold as cold burns do occur, is needed which will be cheap to manufacture (and therefore to buy), consist of as few parts as possible, and be easily reset.

It is envisaged such a valve would also be beneficial in hospitals, hotels, businesses etc. where the proprietor may be liable for injuries sustained whilst on their premises.

It is therefore an object of the present invention to overcome or substantially ameliorate the abovementioned problems.

In accordance with one broad form of the present invention there is provided a safety valve for a fluid delivery means having a duct through which the fluid passes and within which the valve is located, said valve comprising; a valve seat through which the fluid passes; a movable valve member to selectively close said seat; means biassing said valve member into sealing contact with said seat; retaining means engaging said valve member to retain said valve member in a cocked position spaced from said seat; and temperature sensitive means past which the fluid passes said temperature sensitive means being attached to said retaining means to cause movement thereof to release said valve member upon said fluid reaching a predetermined temperature.

Preferably the safety valve will also include a reset mechanism. In one preferred form this reset mechanism would comprise a bush-slidable within the outlet aperture of the housing so that when the tap/shower rose fitting is pushed the bush will be forced within the housing and depress the spring loaded valve stem further within the central shaft so that the head of the stem is forced over the catch and the catch again engages a recess in the valve stem. The bush should be sealingly fitted within the housing to prevent leakage. Also, the bush should abut projections at the end of the housing to prevent being removed from the downstream end of the housing due to the force experienced when the valve is actuated.

In another embodiment the reset mechanism could comprise a lever fitted to and extending within the outlet of the housing. The valve member would protrude within the outlet aperture and upon the lever being moved forward the valve would experience a backward movement and the valve stem would be forced further within the shaft, thereby enabling the catch to engage the recess in the stem.

In a further embodiment the reset mechanism may comprise an extended valve stem with the sealing member located midway. The stem would then protrude beyond the tap/shower fitting and upon depressing this extended stem the other end of the spring loaded stem would be forced further within the central shaft and the catch would engage the notch of the stem.

Some embodiments of the present invention will now be described, by way of example only, with reference to the accompanying drawings in which;

FIG. 9 is a diagramatic representation of one embodiment of the valve of the present invention shown together with a shower rose fitting.

FIG. 10 is a diagrammatic representation of another embodiment of the valve of the present invention shown together with a tap fitting.

Figure 1:
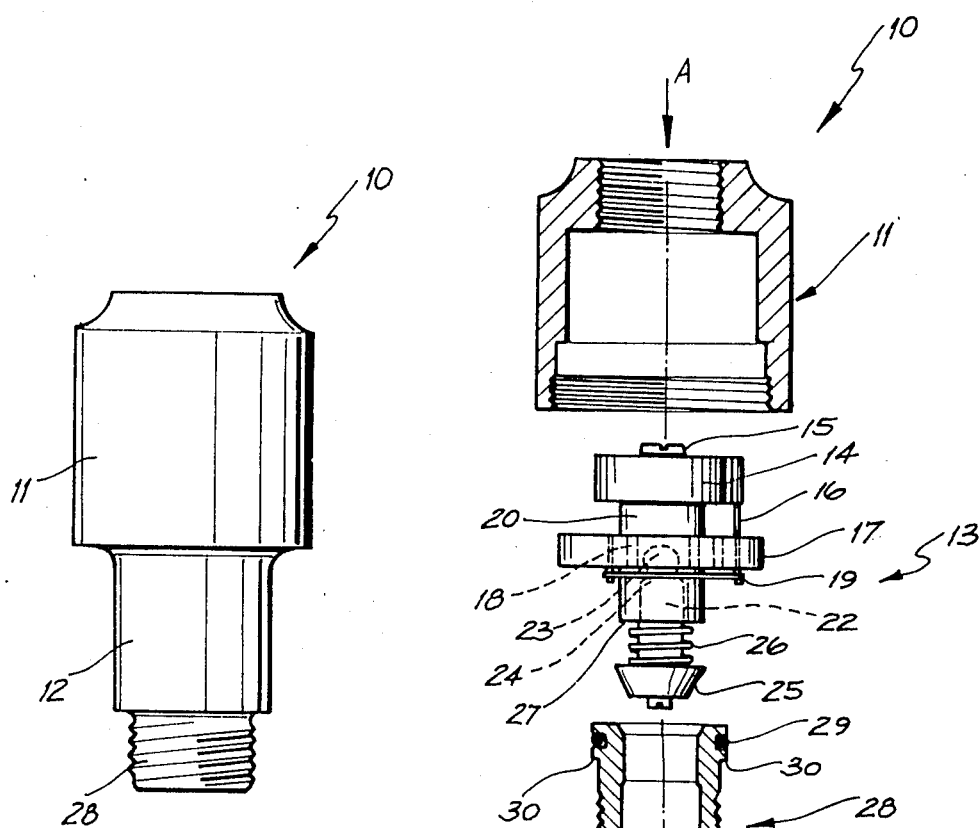
FIG. 1 is a plan view of one embodiment of the safety valve of the present invention.

In FIG. 1 there is depicted the outside housing 11 and 12 of a safety valve 10 of the present invention. Both the outside housing 11, 12 and the valve mechanism 13 are seen in more detail in FIG. 2.

Figure 2:
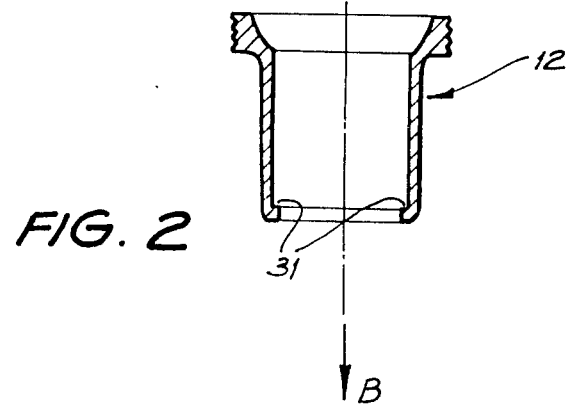
FIG. 2 is an exploded view of the valve at FIG. 1.
Figures 3, 4:
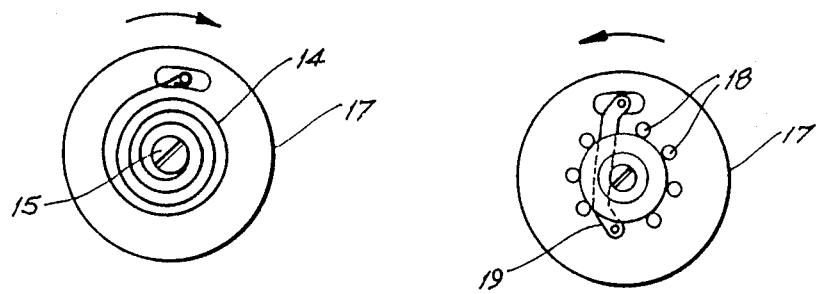
FIG. 3 is an axial view of the bimetallic coil of one embodiment of the present invention viewed from the inlet end of the housing.
FIG. 4 is an axial view of the catch mechanism and annular member of one embodiment of the present invention viewed from the outlet end of the valve.
Figures 5, 6:
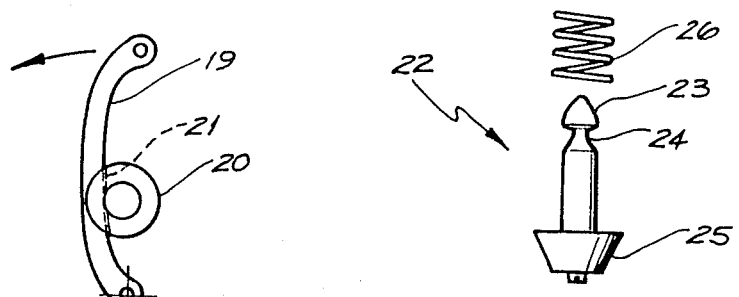
FIG. 5 is the catch mechanism of one embodiment of the present invention, the catch seen here fitted within the notch of the central shaft.
FIG. 6 is a plan view of the spring and valve stem of one embodiment of the present invention.

FIG. 2 shows the safety valve 10 in its exploded form. The outer housing part 11 is connectable to the water outlet pipe (upstream of the tap fitting) by threaded means, whilst the outer housing part 12 is adapted to receive a bush 28 which is in turn threadably connected to the inlet end of the fitting. Thus, the safety valve 10 is positioned between the outlet pipe and the tap/shower fitting, so as to be capable of cutting off the flow from the outlet pipe to the tap/shower fitting when a predetermined temperature is reached.

The valve mechanism 13 comprises a bimetallic coil 14 which is secured at its inner end to a screw 15 and at its outer end to a lever 16. Downstream of the bimetallic coil 14, and on the same axial shaft 20, is an annular member 17. Within this annular member 17 are holes 18 through which the flow of water is allowed. The lever 16 forms the actuating member of a catch mechanism 19. The lever 16 is passed through one of the holes 18 and is attached to the catch 19 on the opposite side of the annular member 17. The positioning of the bimetallic coil 14 biases the catch 19, which is pivotally connected to the downstream side of the member 17, towards the common axial shaft 20. Cut within one side of this shaft 20 is a notch 21 within which the catch comes to rest.

The valve stem 22 is provided to fit within the shaft 20 and enters from the downstream end. The forward end of the valve stem 22 is a conical shaped head 23 and cut into the stem 22, below the conical head 23, is an annular recess 24. When the stem 22 is fully depressed within the shaft 20. The catch mechanism 19, due to its biasing, rests within the recess 24 thus preventing the stem 22 from any longitudinal movement. Attached to the other, downstream, end of the stem 22 is a sealing valve member 25, such as a washer. This washer 25 is shaped so as to fit within, and block the passage to, the outlet end of the outer housing part 12. The stem 22 is spring loaded into the shaft 20 by means of the spring 26 which abuts the end 27 of the shaft 20 and the washer 25.

Fitted within the outer housing 12 is a slidable bush 28. This bush 28 has an O-ring seal 29 and projections 30 which abut the ledge 31 of the housing 12 and prevent the bush 28 from pulling through the casing 12 at the outlet end.

The annular member 17, bimetallic coil 14 catch mechanism 19 and valve stem 22, washer 25 and spring 26 may be seen in more detail in FIGS. 3 to 6.

The safety valve 10 operates in the following manner. The valve 10 is fitted in between the outlet pipe and the tap/shower fitting. Water enters the valve at A in the direction indicated. The water flows past the bimetallic coil 14, which is a simple coiled bimetallic strip such as nickel chromium and copper alloy, and through the holes 18. The flow continues past the spring loaded washer type valve 25 which is held in position by the catch 19 engaging the recess 24 of the valve stem 22, and through the outlet end of the housing 12 exiting at B, the position of the tap/shower fitting. Leakage from around the bush 28 is prevented by the O-ring seal 29. This represents the normal operating condition.

When the temperature exceeds a predetermine value, usually between 45° C. and 55° C. for domestic use, say 50° C., the bimetallic coil expands and activates the lever and catch mechanism 16 and 19, thereby releasing the spring loaded valve stem 22. The washer valve 25 is then propelled into the opening of the bush 28 thereby sealing this opening and preventing continued flow. The pressure of the water will help to hold the valve 25 in position. Again the O-ring seal 29 prevents leakage around the bush 28. This is the mode in which the valve is activated and prevents continued flow to the tap/shower fitting.

To reset the valve the tap/shower rose fitting is depressed along the longitudinal axis of the valve 10, thereby forcing the bush 28 into the valve body. This force in turn depresses the washer valve 25 and the spring loaded valve stem 22 into the shaft 20. At the same time the hot water tap is turned off and the cold water is turned on in order to normalise the bimetallic coil 14 and re-bias the catch mechanism 19 towards the central shaft 20. The tap/shower fitting is then pulled out slightly to reset the bush 28 so as to allow the flow of water again. As the conical head 23 of the stem 22 abuts the catch 19, the catch 19 is forced over the head 23 and again rests within the notch 24, to thereby hold the washer valve 25 in the operative position.

Figure 7:
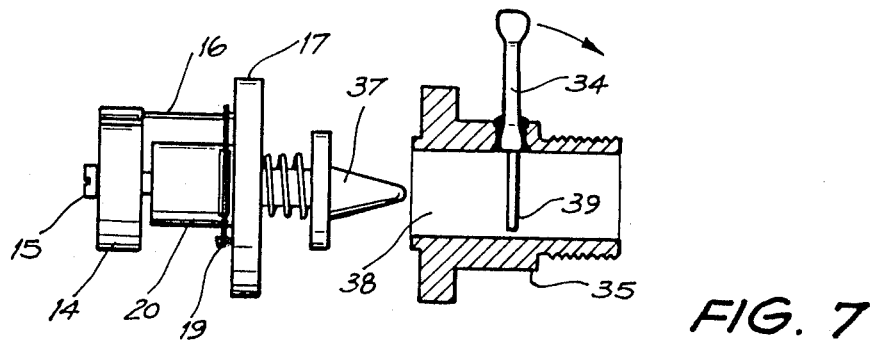
FIG. 7 is an exploded view of the interior of another embodiment of the reset mechanism of the valve of the present invention.

In some situations, such as industrial spouts in hospitals and commercial premises, it is not possible to impart an axial thrust to the tap fitting in order to reset the valve, for such reasons as positioning, and size and shape of the tap. Another mechanism by which the valve may be reset is shown in FIG. 7. In this case the reset activation means is a lever 34 situated on the outlet housing member 35. Since a slidable bush is no longer required the threaded means, the O-ring seal and the lever are provided directly onto the housing member 35.

The washer valve 37 of this reset mechanism has a conical shaped head which fits within and seals the opening of the housing member 35. The lever 34 is sealingly fitted in the housing 35 so as to prevent leakage and to retain the lever 34 in a generally upright position with the lower end 39 of the lever 34 projecting fully into the water outlet aperture 38. In the normal mode of operation the valve stem is held within position as before. The activation of the valve is the same as in the earlier embodiment. In order to reset the valve the hot water is turned off and the cold on whilst the lever 34 is forced forward thereby forcing the lower end 39 of the lever 34 in the direction of the washer valve 37. This movement in turn forces the spring loaded valve stem 22 into the shaft 20 and the valve is reset.

Figure 8:
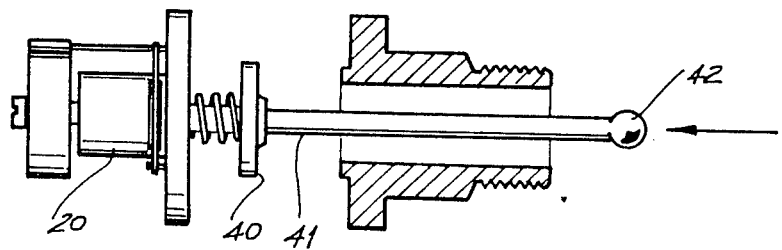
FIG. 8 is an exploded view of the interior of yet another embodiment of the reset mechanism of the present invention.
Figure 11:
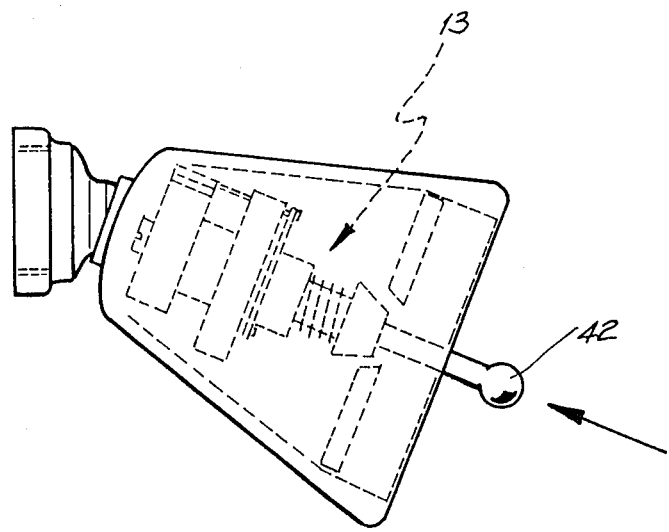
FIG. 11 is a diagrammatic representation of another embodiment of the valve of the present invention shown together with a shower rose fitting.
Figure 12:
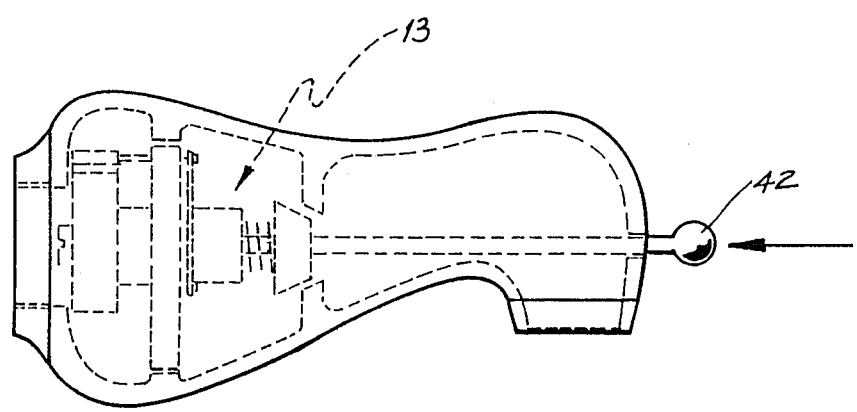
FIG. 12 is a diagramatic representation of yet another valve of the present invention shown together with a tap fitting.

FIGS. 8, 11 and 12 show another reset mechanism, namely a shaft button, which is suitable for valves made integrally within the bath spouts. In this case the valve head comprises a simple washer 40. The activation and operation means are as before. The valve 40 is situated mid-way on an extended valve stem 41. This valve stem 41 protudes beyond the tap/shower fitting. To reset the valve, the end of the stem 41, which may have a button 42, is depressed and the valve stem 41 is forced into the shaft 20 as previously.

The temperature at which the valve is designed to activate may be adjusted by turning the screw 15, onto which the inner end of the coil 14 is attached. Since the screw 15 is facing the inlet end of the housing 11 it is possible to adjust the temperature setting without dismantling the entire device. The valve may also be used in reverse, where it is necessary that the temperature does not fall below a certain value. This can be achieved by turning the bimetallic coil around the opposite way.

It is envisaged that the fitting may be made of any suitable materials such as copper, chromed steel, aluminium etc. The casing may be made in two sections, as seen in the first preferred embodiment, so as to stream line the section of the body which houses the valve and valve stem, or alternatively for economy's sake and where the looks are not as important, the body may be made of just the one piece with the diameter corresponding to the larger diameter of the annular member and the bimetallic coil.

FIGS. 9 to 12 show the safety valve 10 of the present invention adapted for use in several situations.

The bimetallic coil is designed to react to either hot or cold flows and as such this valve can be adapted to react to the temperature of other fluids besides water.

The foregoing describes only some embodiments of the present invention and modifications, obvious to those skilled in the art, can be made thereto without departing from the scope of the present invention.

For example, the catch mechanism may be positioned either upstream (FIGS. 7 and 8) or downstream (FIG.

2) of the annular member 17. Also, the bimetallic strip may be downstream of the annular member 17, but this would tend to inhibit the personal adjustment of the activation temperature. Additionally, the bimetallic strip need not be coiled, but the valve would be more cumbersome in order to accommodate the required length of strip.

What I claim is:

1. A safety valve for a fluid delivery means having a duct through which the fluid passes and within which the valve is located, said valve comprising:

a valve seat through which the fluid passes;

a movable valve member to selectively close said seat, said valve member being movable along an axis generally normal to said seat;

means biassing said valve member into sealing contact with said seat;

retaining means engaging said valve member to retain said valve member in a cocked position spaced from said seat, said retaining means being movable in a direction normal to said axis between a retaining position and a release position with respect to said valve member;

temperature sensitive means past which the fluid passes, said temperature sensitive means engaging said retaining means to cause movement thereof to release said valve member upon said fluid reaching a predetermined temperature; and wherein said temperature sensitive mean is a bimetallic coil having one end engaging said retaining means so that angular displacement of said one end, as a result of said temperature sensitive means reaching said temperature, moves said retaining means to said release position.

2. The safety valve of claim 1 wherein said valve member is located upstream of said valve seat.

3. The safety valve of claim 1 wherein said retaining means is connected to said temperature sensitive means on the upstream side and engages said valve member on the downstream side.

4. The safety valve of claim 1 wherein said temperature sensitive means comprises a bimetallic strip.

5. The safety valve of claim 1 further comprising a reset mechanism.

6. The safety valve of claim 5 wherein said reset mechanism comprises a slidable bush within the outlet of said duct, said bush resetting said valve member in the cocked position when lateral movement within the duct is imparted to said bush.

7. The safety valve of claim 5 wherein said reset mechanism comprises an elongated member forming an extension of said valve member and protruding from the outlet of said duct so that when lateral movement is imparted to said elongated member within said duct, said valve member is returned to the cocked position.

8. The safety valve of claim 5 wherein said reset mechanism comprises a lever extending externally from a side wall of said duct into said duct and positioned so that pivotal movement of said lever will impart backward lateral movement to said valve member thereby returning said valve member to the recocked position.

9. The safety valve of claim 1 further comprising a diffuser located downstream of said temperature sensitive means.

10. The safety valve of claim 1 wherein said retaining means is a lever pivotally mounted so as to be angularly movable between said retaining position and said release position.

* * * * *